United States P

Sugiyama

[54] SEMI-WIDE ANGLE PHOTOGRAPHIC LENS HAVING SHORT OVERALL LENGTH

[75] Inventor: Takahiro Sugiyama, Tokyo, Japan

[73] Assignee: Asahi Kogaku Kogyo Kabushiki Kaisha, Tokyo, Japan

[21] Appl. No.: 2,137

[22] Filed: Jan. 9, 1979

[30] Foreign Application Priority Data

Jan. 23, 1978 [JP] Japan .................................. 53-6031

[51] Int. Cl.² ......................... G02B 9/60; G02B 13/04
[52] U.S. Cl. .................................................. 350/216
[58] Field of Search .......................................... 350/216

4,223,982

[45] Sep. 23, 1980

[56] References Cited

U.S. PATENT DOCUMENTS 3,410,632 11/1968 Woltche .............................. 350/216

*Primary Examiner*—Conrad J. Clark
*Attorney, Agent, or Firm*—Sughrue, Rothwell, Mion, Zinn and Macpeak

[57] ABSTRACT

A semi-wide angle photographic lens having short overall length is disclosed comprising six lens elements grouped into five components. The fourth component is composed of negative and positive lenses cemented each other to have a positive resultant focal length. The lens system has an aperture ratio of 1:2.8 and a view angle of ±24°.

3 Claims, 6 Drawing Figures

SEMI-WIDE ANGLE PHOTOGRAPHIC LENS HAVING SHORT OVERALL LENGTH

BACKGROUND OF THE INVENTION

This invention relates to a novel photographic lens system having a relatively wide view angle of ±24° and an aperture ratio of 1:2.8. The lens is designed so as to have a short overall length. The length of the lens is approximately 0.5 F, where F is the overall focal length. This length is very short in such a class of lenses. However, the lens has a sufficiently long backfocal length with good compensation of various aberrations.

SUMMARY OF THE INVENTION

In view of the deficiencies in the prior art it is an object of this invention to provide for a wide angle lens having a short overall length.

It is another object of this invention to provide a wide angle lens of short overall length having a sufficiently long backfocal length with good compensation of various aberations.

Still another object of this invention is to provide a wide angle lens of compact design yet offering improved optical characteristics.

DETAILED DESCRIPTION OF THE INVENTION

Figure 1:
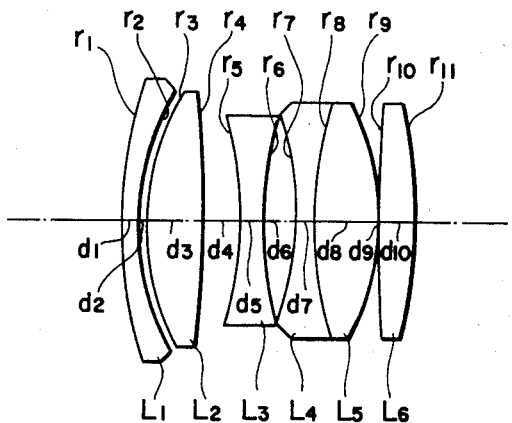
FIG. 1 is a lens construction according to the first Example of the invention.
Figure 3:
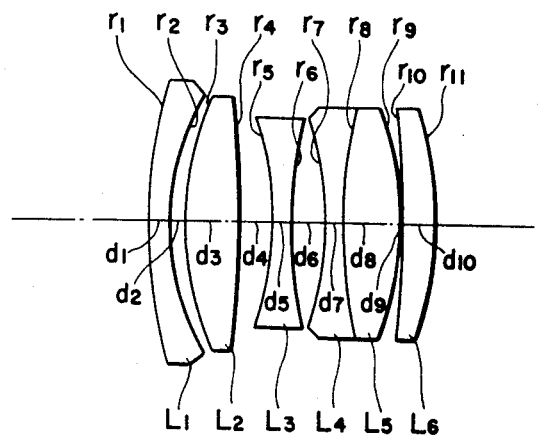
FIG. 3 is a lens construction according to the second Example of the invention.
Figure 5:
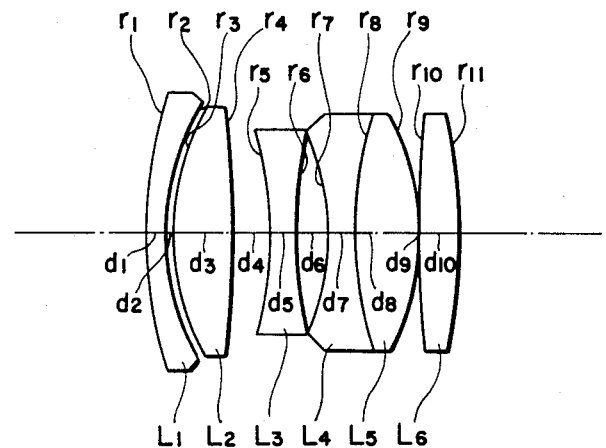
FIG. 5 is a lens construction according to the third Example of the invention.

Referring to the lens construction views of the lenses according to Examples 1 to 3, shown in FIGS. 1, 3 and 5, respectively, the individual lens elements are positioned along the optical axis. The lenses are shown such that the object side is on the left and the image side is on the right. The lens surfaces are designated by $r_1, r_2, r_3, \ldots, r_{11}$, and the distance between two adjacent surfaces along the optical axis is designated by $d_j$, where $d_j$ is the distance between adjacent surfaces $r_j$ and $r_{j+1}$.

The lens construction according to the invention will be hereinafter described. The lens is composed of six lens elements grouped into five components. A first component is a negative meniscus lens $L_1$ having a convex surface $r_1$ directed toward the object. A second component is a positive lens $L_2$. A third component is a negative lens $L_3$. A fourth component is composed of negative and positive lenses $L_4, L_5$ cemented together along surface $r_8$. The fourth component has a positive focal length. A fifth component is a positive lens $L_6$.

The photographic lens of the above described construction is specifically designed to satisfy the following conditions:

$$(F/1.7) < F_{1 \cdot 2} < (F/1.1) \tag{1}$$

$$0.005\, F < d_2 < 0.1\, F \tag{2}$$

$$|F_{1 \cdot 2 \cdot 3}| > (F/0.3) \tag{3}$$

$$0.05\, F < d_4 < 0.15\, F \tag{4}$$

$$0.4 < \Sigma_d < 0.7\, F \tag{5}$$

where,

F is the overall focal length;

$F_{1 \cdot 2 \cdot 3 \ldots i}$ is the resultant focal length from the first lens component to the i-th lens component;

$r_j$ is the radius of curvature of the j-th lens surface;

$d_j$ is the lens thickness or the aerial space between the j-th surface and the (j+1)-th surface;

$\nu_k$ is the Abbe number of the k-th lens; and $\Sigma_d$ is the overall lens length.

Each of the conditions will be described in detail.

Condition (1) of $(F/1.7) < F_{1 \cdot 2} < (F/1.1)$ is required to obtain a sufficient backfocal length and to compensate for coma aberration and distortion aberration. When $F_{1 \cdot 2}$ exceeds the lower limit of $(F/1.7)$, cooperating with conditions (3) and (4), it is difficult to obtain a sufficient backfocal length. Conversely, when the upper limit of $(F/1.1)$ is exceeded, though available to obtain a sufficient backfocal length, the radius of curvature becomes longer than required and also cooperating with condition (3), the focal length of the negative lens of the third component becomes too large. As a result, it is difficult to compensate for coma aberration and distortion aberration.

Condition (2) of $0.005\, F < d_2 < 0.1\, F$ is required to miniaturize the lens system. When the upper limit of 0.1 F is exceeded, the overall length of the lens becomes disadvantageously large. Conversely, when the lower limit of 0.005 F is exceeded, though the lens overall length can be shortened, it is impossible to produce such a lens.

Condition (3) of $|F_{1 \cdot 2 \cdot 3}| > (F/0.3)$ is required to determine the focal length of the negative lens $L_3$ of the third component cooperating with condition (1), to obtain a sufficient backfocal length and to compensate for the coma aberration. When $|F_{1 \cdot 2 \cdot 3}|$ is smaller than the lower limit and $F_{1 \cdot 2 \cdot 3}$ is positive, it is not only difficult to obtain a sufficient backfocal length but also the focal length of the negative lens $L_3$ of the third component increases so that Petzval's sum increases. This causes an increase of the field curvature. When $F_{1 \cdot 2 \cdot 3}$ is negative and the absolute value of $F_{1 \cdot 2 \cdot 3}$ is smaller than the lower limit value, though available to obtain a sufficient backfocal length, the focal lengths of the positive lenses disposed following the fourth lens component become too small so that coma aberration is deteriorated and at the same time this causes an increase of spherical aberration.

Condition (4) of $0.05\, F < d_4 < 0.15\, F$ is required to maintain the size of the lens small and relates to the compensation of the chromatic aberration. When the upper limit of 0.15 F is exceeded, not only is the overall lens length increased, but the residual chromatic aberration of magnification remaining to the second lens component is also increased. It is difficult to compensate for it with the lens disposed following the second lens component. Conversely, when the lower limit of 0.05 F is exceeded, since the negative lens of the third lens component is defined by conditions (1) and (3), Petzval's sum increases. This causes an increase of the field curvature.

Condition (5) of $0.4\,F < \Sigma_d < 0.7\,F$ is required to maintain the lens length small, which is one of the specific objects of the invention. When the upper limit of $0.7\,F$ is exceeded, the overall length of the lens becomes excessive. This is inconsistent with the object of the invention. Conversely, when the lower limit of $0.4\,F$ is exceeded, though the overall lens length is shortened, the end thicknesses of the lenses become smaller than required. It is also impossible to produce such a lens.

The semi-wide angle photographic lens according to the invention is designed to satisfy the above described conditions, having an aperture ratio 1:2.8 and a view angle of $\pm 24°$. Further, the overall length of the lens can be maintained very small. Further, the various aberrations can be well compensated.

Figure 2:
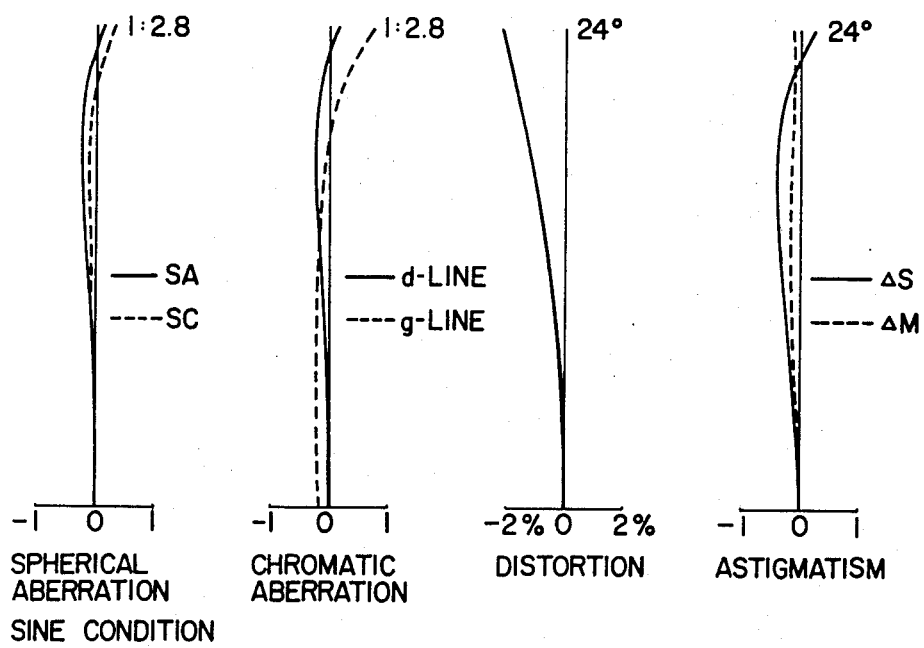
FIG. 2 are graphs showing the various aberration curves for the lens of the first Example.
Figure 4:
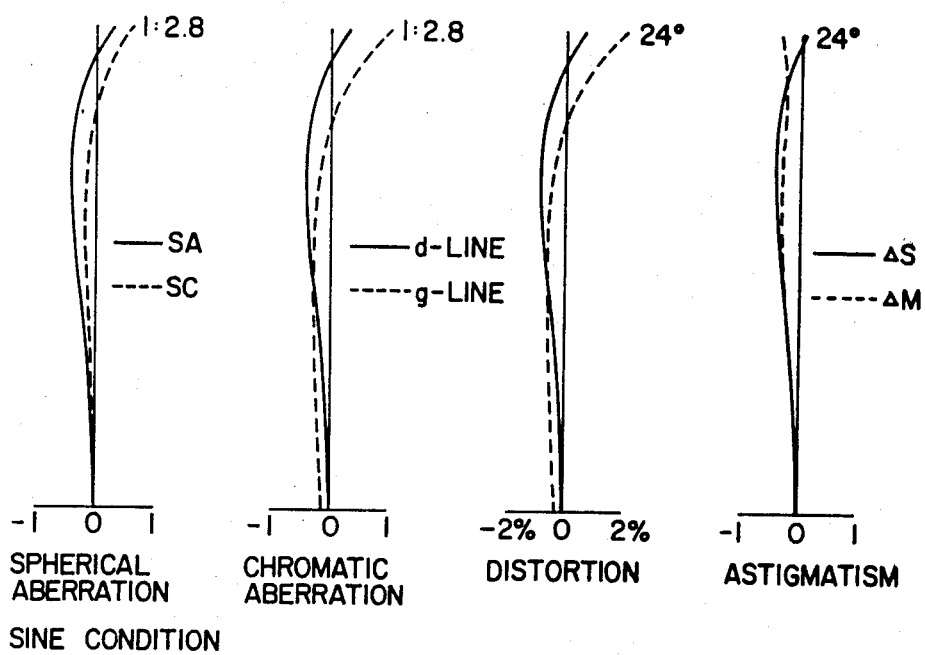
FIG. 4 are graphs showing the various aberration curves for the lens of the second Example.
Figure 6:
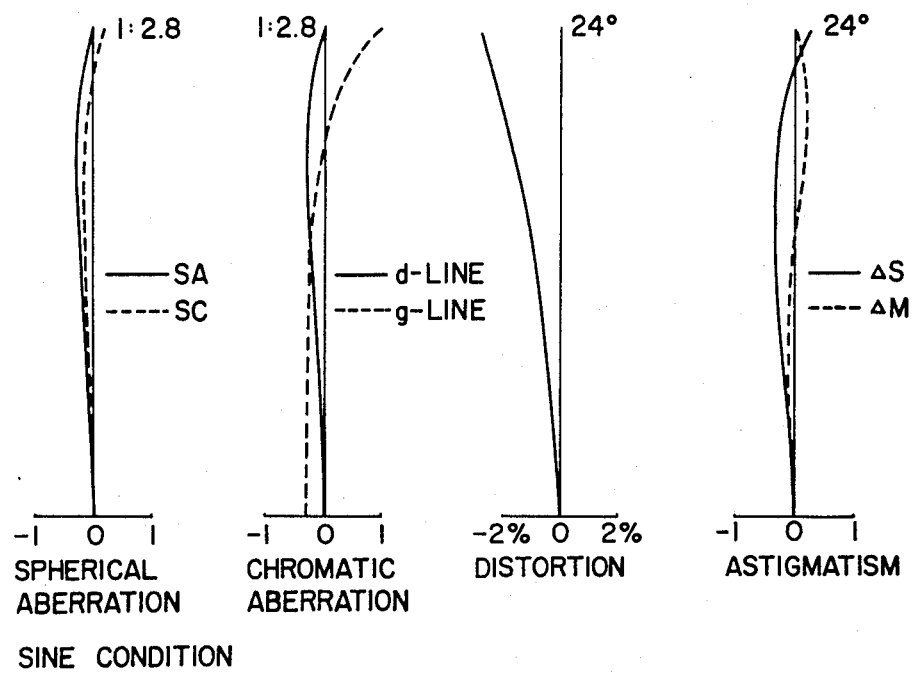
FIG. 6 are graphs showing the various aberration curves for the lens of the third Example.

The specific parameters for Examples 1 to 3 are given below. In the Examples, all linear dimensions are numerals such that the overall focal length F is estimated as 100. The aberration curves resulting from lenses according to Examples 1 to 3 are shown in FIGS. 2, 4 and 6, respectively.

EXAMPLE 1

| | | OVERALL FOCAL LENGTH $F = 100$, | | APERTURE RATIO 1 : 2.8 | | VIEW ANGLE $\pm 24°$ | |
|---|---|---|---|---|---|---|---|
| $L_1$ | $r_1 =$ | 71.91 | $d_1 =$ | 3.26 | $n_1 = 1.72825$ | $\nu_1 = 28.5$ | |
| | $r_2 =$ | 42.26 | $d_2 =$ | 1.59 | | | |
| $L_2$ | $r_3 =$ | 43.90 | $d_3 =$ | 9.18 | $n_2 = 1.76200$ | $\nu_2 = 40.2$ | |
| | $r_4 =$ | $-248.88$ | $d_4 =$ | 6.76 | | | |
| $L_3$ | $r_5 =$ | $-59.63$ | $d_5 =$ | 4.11 | $n_3 = 1.58913$ | $\nu_3 = 61.1$ | |
| | $r_6 =$ | 71.64 | $d_6 =$ | 5.44 | | | |
| $L_4$ | $r_7 =$ | $-47.40$ | $d_7 =$ | 3.36 | $n_4 = 1.72825$ | $\nu_4 = 28.5$ | |
| | $r_8 =$ | 67.40 | $d_8 =$ | 10.74 | $n_5 = 1.72000$ | $\nu_5 = 50.2$ | |
| $L_5$ | $r_9 =$ | $-45.18$ | $d_9 =$ | 0.41 | | | |
| $L_6$ | $r_{10} =$ | 399.80 | $d_{10} =$ | 6.15 | $n_6 = 1.76200$ | $\nu_6 = 40.2$ | |
| | $r_{11} =$ | $-94.37$ | | | | | |

Backfocus $= 95.967 = 0.96\,F$
$F_{1\cdot 2} = 75.148 = \dfrac{F}{1.33}$
$F_{1\cdot 2\cdot 3} = -519.534 = -\dfrac{F}{0.19}$
$\Sigma_d = 51.02 = 0.51\,F$
Petzval's sum $= 0.208$

EXAMPLE 2

| | | OVERALL FOCAL LENGTH $F = 100$ | | APERTURE RATIO 1 : 2.8 | | VIEW ANGLE $\pm 24°$ |
|---|---|---|---|---|---|---|
| $L_1$ | $r_1 = 76.53$ | | $d_1 = 4.09$ | | $n_1 = 1.72825$ | $\nu_1 = 28.5$ |
| | $r_2 = 44.06$ | | $d_2 = 2.49$ | | | |
| $L_2$ | $r_3 = 49.22$ | | $d_3 = 9.67$ | | $n_2 = 1.80610$ | $\nu_2 = 40.9$ |
| | $r_4 = -173.55$ | | $d_4 = 6.20$ | | | |
| $L_3$ | $r_5 = -48.98$ | | $d_5 = 3.43$ | | $n_3 = 1.58913$ | $\nu_3 = 61.1$ |
| | $r_6 = 82.29$ | | $d_6 = 5.18$ | | | |
| $L_4$ | $r_7 = -64.49$ | | $d_7 = 3.35$ | | $n_4 = 1.76182$ | $\nu_4 = 26.6$ |
| | $r_8 = 84.16$ | | $d_8 = 10.04$ | | $n_5 = 1.77250$ | $\nu_5 = 49.6$ |
| $L_5$ | $r_9 = -50.49$ | | $d_9 = 0.41$ | | | |
| $L_6$ | $r_{10} = -175.36$ | | $d_{10} = 5.76$ | | $n_6 = 1.80610$ | $\nu_6 = 40.9$ |
| | $r_{11} = -63.53$ | | | | | |

Backfocus $= 95.951 = 0.96\,F$
$F_{1\cdot 2} = 71.352 = \dfrac{F}{1.40}$
$F_{1\cdot 2\cdot 3} = -426.985 = -\dfrac{F}{0.23}$
$\Sigma_d = 50.62 = 0.51\,F$
Petzval's sum $= 0.195$

EXAMPLE 3

| | | OVERALL FOCAL LENGTH $F = 100$, | | APERTURE RATIO 1 : 2.8 | | VIEW ANGLE $\pm 24°$ |
|---|---|---|---|---|---|---|
| $L_1$ | $r_1 = 73.13$ | | $d_1 = 3.44$ | | $n_1 = 1.72825$ | $\nu_1 = 28.5$ |
| | $r_2 = 40.94$ | | $d_2 = 1.69$ | | | |
| $L_2$ | $r_3 = 43.15$ | | $d_3 = 9.54$ | | $n_2 = 1.72342$ | $\nu_2 = 38.0$ |
| | $r_4 = -200.63$ | | $d_4 = 6.91$ | | | |
| $L_3$ | $r_5 = -61.94$ | | $d_5 = 4.85$ | | $n_3 = 1.58913$ | $\nu_3 = 61.1$ |
| | $r_6 = 84.07$ | | $d_6 = 5.49$ | | | |
| $L_4$ | $r_7 = -44.49$ | | $d_7 = 4.76$ | | $n_4 = 1.72825$ | $\nu_4 = 28.5$ |
| | $r_8 = 60.51$ | | $d_8 = 11.60$ | | $n_5 = 1.69350$ | $\nu_5 = 50.8$ |
| $L_5$ | $r_9 = -43.72$ | | $d_9 = 0.40$ | | | |

-continued

| | | | | | |
|---|---|---|---|---|---|
| $L_6$ | $r_{10} = 241.43$ | $d_{10} = 6.43$ | $n_6 = 1.72342$ | $\nu_6 = 38.0$ | |
| | $r_{11} = -102.08$ | | | | |

Backfocus = 98.980 = 0.99 F $F_{1\text{-}2} = 79.601 = \dfrac{F}{1.26}$ $F_{1\text{-}2\text{-}3} = -680.735 = -\dfrac{F}{0.15}$ $\Sigma_d = 55.11 = 0.55\,F$ Petzval's sum = 0.244

What is claimed is:

1. A miniaturized semi-wide angle photographic lens system having six lens elements grouped into five components, comprising in order from the object side, a first component being a negative meniscus lens $L_1$ having convex surface directed toward the object, a second component being a positive lens $L_2$, a third component being a negative lens $L_3$, a fourth component is composed of negative and positive lenses $L_4$, $L_5$ cemented to each other, said fourth component having a positive focal length, and a fifth component is a positive lens $L_6$, the lens system satisfying the following conditions:

| OVERALL FOCAL LENGTH F = 100, | | APERTURE RATIO 1 : 2.8 | | VIEW ANGLE ± 24° | |
|---|---|---|---|---|---|
| $L_1$ | $r_1 = 71.91$ | $d_1 = 3.26$ | $n_1 = 1.72825$ | $\nu_1 = 28.5$ | |
| | $r_2 = 42.26$ | $d_2 = 1.59$ | | | |
| $L_2$ | $r_3 = 43.90$ | $d_3 = 9.18$ | $n_2 = 1.76200$ | $\nu_2 = 40.2$ | |
| | $r_4 = -248.88$ | $d_4 = 6.76$ | | | |
| $L_3$ | $r_5 = -59.63$ | $d_5 = 4.11$ | $n_3 = 1.58913$ | $\nu_3 = 61.1$ | |
| | $r_6 = 71.64$ | $d_6 = 5.44$ | | | |
| $L_4$ | $r_7 = -47.40$ | $d_7 = 3.36$ | $n_4 = 1.72825$ | $\nu_4 = 28.5$ | |
| $L_5$ | $r_8 = 67.40$ | $d_8 = 10.74$ | $n_5 = 1.72000$ | $\nu_5 = 50.2$ | |
| | $r_9 = -45.18$ | $d_9 = 0.41$ | | | |

-continued

| OVERALL FOCAL LENGTH F = 100, | | APERTURE RATIO 1 : 2.8 | | VIEW ANGLE ± 24° | |
|---|---|---|---|---|---|
| $L_6$ | $r_{10} = 399.80$ | $d_{10} = 6.15$ | $n_6 = 1.76200$ | $\nu_6 = 40.2$ | |
| | $r_{11} = -94.37$ | | | | |

Backfocus = 95.967 = 0.96 F $F_{1\text{-}2} = 75.148 = \dfrac{F}{1.33}$ $F_{1\text{-}2\text{-}3} = -519.534 = -\dfrac{F}{0.19}$ $\Sigma_d = 51.02 = 0.51\,F$ Petzval's sum = 0.208 where:

$r_1$–$r_{11}$ is the lens surface, $d_1$–$d_{10}$ is distance between two adjacent surfaces along the optical axis, F is the focal length, $n_1$–$n_6$ is the refractive index of the lens, $\nu_1$–$\nu_6$ is Abbe number, $\Sigma_d$ is the overall lens length.

2. A miniaturized semi-wide angle photographic lens system having six lens elements grouped into five components, comprising in order from the object side, a first component being a negative meniscus lens $L_1$ having a convex surface directed toward the object, a second component being a positive lens $L_2$, a third component being a negative lens $L_3$, a fourth component is composed of negative and positive lenses $L_4$, $L_5$ cemented to each other, said fourth component having a positive focal length, and a fifth component is a positive lens $L_6$, the lens system satisfying the following conditions:

| OVERALL FOCAL LENGTH F = 100 | | APERTURE RATIO 1 : 2.8 | | VIEW ANGLE ± 24° | |
|---|---|---|---|---|---|
| $L_1$ | $r_1 = 76.53$ | $d_1 = 4.09$ | $n_1 = 1.72825$ | $\nu_1 = 28.5$ | |
| | $r_2 = 44.06$ | $d_2 = 2.49$ | | | |
| $L_2$ | $r_3 = 49.22$ | $d_3 = 9.67$ | $n_2 = 1.80610$ | $\nu_2 = 40.9$ | |
| | $r_4 = -173.55$ | $d_4 = 6.20$ | | | |
| $L_3$ | $r_5 = -48.98$ | $d_5 = 3.43$ | $n_3 = 1.58913$ | $\nu_3 = 61.1$ | |
| | $r_6 = 82.29$ | $d_6 = 5.18$ | | | |
| $L_4$ | $r_7 = -64.49$ | $d_7 = 3.35$ | $n_4 = 1.76182$ | $\nu_4 = 26.6$ | |
| $L_5$ | $r_8 = 84.16$ | $d_8 = 10.04$ | $n_5 = 1.77250$ | $\nu_5 = 49.6$ | |
| | $r_9 = -50.49$ | $d_9 = 0.41$ | | | |
| $L_6$ | $r_{10} = -175.36$ | $d_{10} = 5.76$ | $n_6 = 1.80610$ | $\nu_6 = 40.9$ | |
| | $r_{11} = -63.53$ | | | | |

Backfocus = 95.951 = 0.96 F $F_{1\text{-}2} = 71.352 = \dfrac{F}{1.40}$ $F_{1\text{-}2\text{-}3} = -426.985 = -\dfrac{F}{0.23}$ $\Sigma_d = 50.62 = 0.51\,F$ Petzval's sum = 0.195 where:
- $r_1$–$r_{11}$ is the lens surface,
- $d_1$–$d_{10}$ is distance between two adjacent surfaces along the optical axis,
- F is the focal length,
- $n_1$–$n_6$ is the refractive index of the lens,
- $\nu_1$–$\nu_6$ is Abbe number,
- $\Sigma_d$ is the overall lens length.

3. A miniaturized semi-wide angle photographic lens system having six lens elements grouped into five components, comprising in order from the object side, a first component being a negative meniscus lens $L_1$ having a convex surface directed toward the object, a second component being a positive lens $L_2$, a third component being a negative lens $L_3$, a fourth component is composed of negative and positive lenses $L_4$, $L_5$ cemented to each other, said fourth component having a positive focal length, and a fifth component is a positive lens $L_6$, the lens system satisfying the following conditions:

| OVERALL FOCAL LENGTH F = 100. | | APERTURE RATIO 1 : 2.8 | | VIEW ANGLE ± 24° |
|---|---|---|---|---|
| $L_1$ | $r_1 = 73.13$ | $d_1 = 3.44$ | $n_1 = 1.72825$ | $\nu_1 = 28.5$ |
| | $r_2 = 40.94$ | $d_2 = 1.69$ | | |
| $L_2$ | $r_3 = 43.15$ | $d_3 = 9.54$ | $n_2 = 1.72342$ | $\nu_2 = 38.0$ |
| | $r_4 = -200.63$ | $d_4 = 6.91$ | | |
| $L_3$ | $r_5 = -61.94$ | $d_5 = 4.85$ | $n_3 = 1.58913$ | $\nu_3 = 61.1$ |
| | $r_6 = 84.07$ | $d_6 = 5.49$ | | |
| $L_4$ | $r_7 = -44.49$ | $d_7 = 4.76$ | $n_4 = 1.72825$ | $\nu_4 = 28.5$ |
| $L_5$ | $r_8 = 60.51$ | $d_8 = 11.60$ | $n_5 = 1.69350$ | $\nu_5 = 50.8$ |
| | $r_9 = -43.72$ | $d_9 = 0.40$ | | |
| $L_6$ | $r_{10} = 241.43$ | $d_{10} = 6.43$ | $n_6 = 1.72342$ | $\nu_6 = 38.0$ |
| | $r_{11} = -102.08$ | | | |

Backfocus = 98.980 = 0.99 F
$F_{1.2} = 79.601 = \dfrac{F}{1.26}$
$F_{1.2.3} = -680.735 = -\dfrac{F}{0.15}$
$\Sigma_d = 55.11 = 0.55\, F$
Petzval's sum = 0.244 where:
- $r_1$–$r_{11}$ is the lens surface,
- $d_1$–$d_{10}$ is distance between two adjacent surfaces along the optical axis,
- F is the focal length,
- $n_1$–$n_6$ is the refractive index of the lens,
- $\nu_1$–$\nu_6$ is Abbe number,
- $\Sigma_d$ is the overall lens length.

* * * * *